United States Patent [19]

Shimosato et al.

[11] Patent Number: 4,646,111

[45] Date of Patent: Feb. 24, 1987

[54] INK DOT PRINTER

[75] Inventors: Masashi Shimosato; Yoshihiro Torisawa; Hisashi Nishikawa; Mitsuharu Endo, all of Shizuoka, Japan

[73] Assignee: Tokyo Electric Co., Ltd., Tokyo, Japan

[21] Appl. No.: 842,279

[22] Filed: Mar. 21, 1986

[30] Foreign Application Priority Data

Mar. 22, 1985 [JP] Japan .................................. 60-57753

[51] Int. Cl.[4] .............................................. G01D 15/16

[52] U.S. Cl. .................................. 346/140 R; 400/124

[58] Field of Search ................... 346/140, 75; 400/124

[56] References Cited

U.S. PATENT DOCUMENTS 4,199,767 4/1980 Campbell .............................. 346/75
4,450,454 5/1984 Koto .................................... 346/140
4,603,338 7/1986 Nakayama ........................... 346/140

FOREIGN PATENT DOCUMENTS 53-57035 5/1978 Japan .
54-136331 10/1979 Japan .
56-4467 1/1981 Japan .
56-42664 4/1981 Japan .
56-63455 5/1981 Japan .
56-170 6/1981 Japan .
56-120358 9/1981 Japan .

*Primary Examiner*—Joseph W. Hartary
*Attorney, Agent, or Firm*—Oblon, Fisher, Spivak, McClelland & Maier

[57] ABSTRACT

An ink dot printer comprising an opposite electrode, a carriage capable of reciprocating along the opposite electrode, a printing head mounted on the carriage, recording electrodes arranged within the printing head so that the tips thereof can be exposed through openings formed in a wall of the printing head opposite the opposite electrode, and a cap supported moveably on either the carriage or the printing head so as to close or open the openings of the printing head. When the ink dot printer is not in printing operation, the cap is closed to cover up the tips of the recording electrodes to prevent the drying of the tips of the recording electrode due to the evaporation of the ink so that the recording electrodes are always in good condition for stable printing operation.

11 Claims, 24 Drawing Figures

INK DOT PRINTER

FIELD OF THE INVENTION AND RELATED ART STATEMENT

The present invention relates to a dot printer capable of forming images on a recording medium by aggregates of dots and, more particularly, to an ink dot printer capable of spattering ink droplets on a recording medium by electrostatic means.

DESCRIPTION OF THE PRIOR ART

A conventional ink dot printer which spouts ink droplets through a nozzle on a recording medium for form images has an inevitable disadvantage that the nozzle is liable to be clogged with the ink. Unexamined Japanese Patent Publication (Kokai) No. 56-170 discloses an ink dot printer having a slit for discharging the ink therethrough and a plurality of electrodes disposed opposite to the slit. This ink dot printer, however, has a problem that the position of ink droplets discharged through the slit on the recording medium is variable and the print is unstable.

Unexamined Japanese Patent Publication (Kokai) No. 56-4467 discloses an improved ink dot printer as illustrated in FIG. 24. In this ink dot printer, a plurality of recording electrodes 2 are disposed within a slit 1 retaining the ink and an opposite electrode 4 is disposed opposite to the recording electrodes 2. A recording sheet is interposed between the recording electrodes 2 and the opposite electrode 4. The recording electrodes 2 and the opposite electrode 4 are connected to a power source 6, in which the recording electrodes 2 are connected to the power source 6 through switching elements 5, respectively. The power source 6 produces a potential difference sufficient to cause the ink to be spattered from the slit 1 toward the opposite electrode 4 between the recording electrodes 2 and the opposite electrode 4. In operation, the switching elements 5 are closed selectively according to print signals for printing desired images on the recording sheet 3. A potential difference is produced between the individual recording electrodes 2 and the opposite electrode 4, and thereby the ink retained near the recording electrode 2 to which a voltage is applied is spattered toward the opposite electrode 4 for printing.

Unexamined Japanese Patent Publication (Kokai) No. 56-42664 discloses another ink dot printer of such a constitution.

However, these ink dot printers of the prior art has the following problems. Even if a slit having a comparatively large aperture area is employed instead of a nozzle having a small aperture area, it is impossible to inhibit the evaporation of the ink completely. Particularly, when the slit is left idle for an extended period of time, the ink dries and adheres to the slit to make smooth printing operation impossible. Furthermore, even if the adhesive accumulation of the ink in the slit is not as heavy as to clog the slit, the irregular adhesive accumulation of the ink around the recording electrodes 2 causes undesirable variation in the electric field, which makes it difficult to achieve the stable spatter of the ink.

OBJECT AND SUMMARY OF THE INVENTION

It is an object of the present invention to provide an ink dot printer capable of completely preventing the ink drying around the tips of the recording electrodes.

In order to achieve the object of the invention, an ink dot printer according to the present invention is provided with a printing head having an opening for exposing only the tips of recording electrodes wetted with the ink, a carriage mounted with the printing head and capable of reciprocating along the longitudinal directions of the opposite electrode, and cap for covering the opening of the printing head, attached to the carriage.

While the ink dot printer is not operated, the opening of the printing head is covered with the cap, and hence the evaporation of the ink is inhibited regardless of the shape of the opening, namely, if the opening is round or elongate. Accordingly, the ink does not dry and accumulate in the opening and the opening is not clogged with the accumulation of the dried ink even in the ink dot printer is left idle for a long time, and hence stable printing operation is achieved.

BRIEF DESCRIPTION OF THE DRAWINGS

In FIGS. 1 to 24, like reference characters designate like or corresponding parts throughout.

DETAILED DESCRIPTION OF THE PREFERRED EMBODIMENTS

Referring to FIGS. 1 to 4, a first embodiment of the present invention will be described hereinafter.

Figure 1:
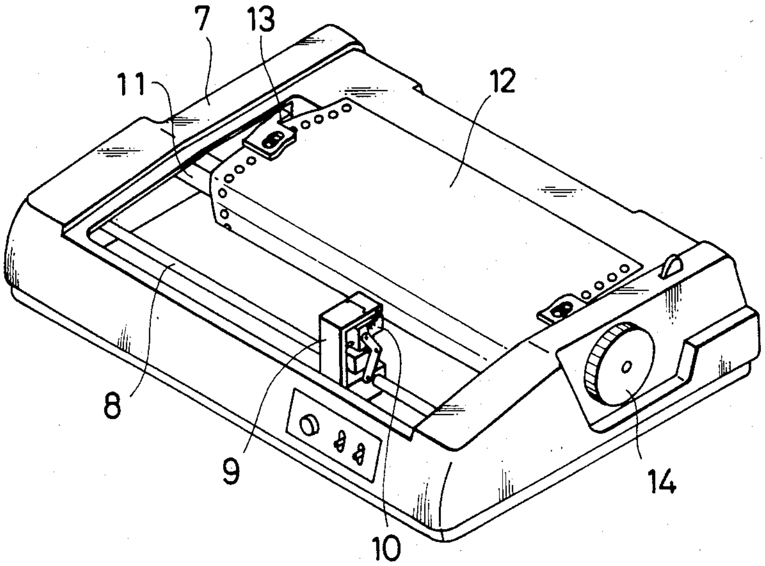
FIG. 1 is a perspective view of a first embodiment of the present invention.
Figure 2:
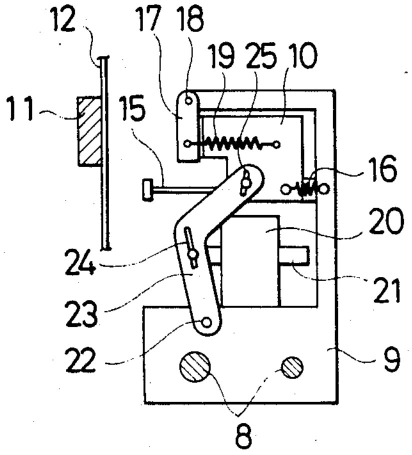
FIG. 2 is a sectional side elevation of a printing head mounted on a carriage in the resting position.
Figure 3:
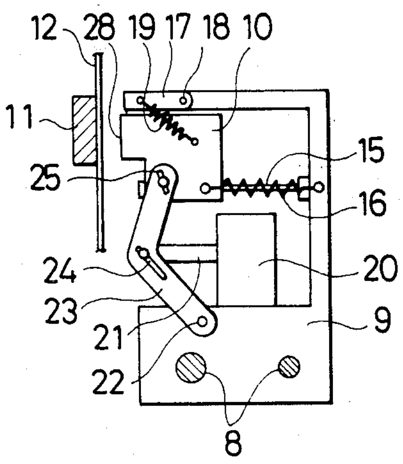
FIG. 3 is a sectional side elevation of the printing head of FIG. 2 in printing operation.

Two horizontal guide shafts 8 (only one of them is illustrated in FIG. 1) are provided on the front side of an ink dot printer 7. A carriage 9 is attached slidably to the guide shafts 8 for reciprocation along the same. A printing head 10 is mounted on the carriage 9. A horizontal opposite electrode 11 is disposed opposite to the printing head 10 in the central section of the ink dot printer 7. A tractor 13 for feeding a recording sheet 12 is disposed behind the opposite electrode 11. A knob 14 is provided outside the casing of the ink dot printer 7 and is joined to the tractor 13.

The printing head 10 is supported slidably on a guide rod 15 attached to the carriage 9 so as to extend toward the opposite electrode 11 for reciprocation on the guide rod 15. The printing head 10 is urged away from the opposite electrode 11 by an extension coil spring 16. A cap 17 is attached pivotally to the front end of the upper part of the carriage 9 for swing motion on a shaft 18. The cap 17 is pulled so as to cover the front side of the printing head 10 by an extension coil spring 19 extended between the cover 17 and the printing head 10. Electromagnets, not shown, are buried in the cap 17 and the front side of the printing head 10, respectively. A packing or the like is provided between the cap 17 and the front side of the printing head 10 to cover the front side of the printing head closely with the cap 17. An electromagnetic device having an armature 21 and a solenoid 20 is disposed fixedly on the carriage 9 below the printing head 10. One end of the armature 21 engages a slot 24 formed in the middle portion of a substantially L-shaped lever 23. The lever 23 is joined pivotally by a pin 22 to the carriage 9. A pin fixed to the printing head 10 is fitted in a slot 25 formed in the upper end of the lever 23. The lever 23 serves as a member of a mechanical amplifying mechanism for magnifying the movement of the armature 21.

Figure 4:
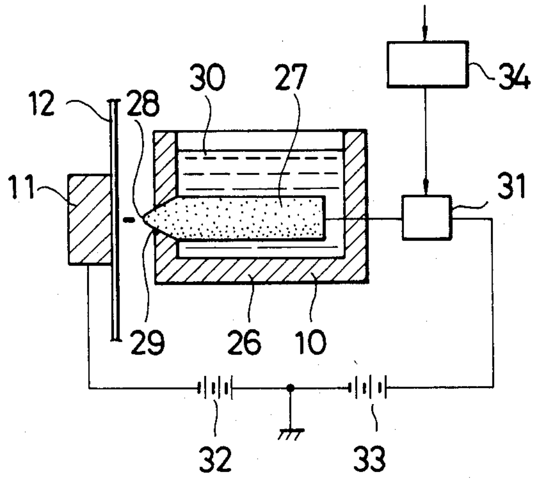
FIG. 4 is a sectional side elevation showing the constitution of the printing head of the first embodiment.

Referring to FIG. 4 illustrating the constitution of the printing head in detail, recording electrodes 27 are disposed within an ink container 26 with their conical tips 28 projecting through openings 29 from the ink container 26, respectively. The recording electrodes 27 are conductive and are capable of being impregnated with and holding the ink. The ink container 26 is filled with the ink 30.

Two sets of high voltage power sources 32 and 33 are connected through a high voltage switch 31 to each recording electrode 27 and to the opposite electrode 11. A wire interconnecting the high voltage power sources 32 and 33 is grounded. A print control circuit 34 which generates control signals corresponding to image signals is connected to the high voltage power source 31.

Since the recording electrodes 27 are capable of being impregnated with and holding the ink 30, the ink 30 is supplied sufficiently to the tips 28 of the recording electrodes 27. Moreover, since the recording electrodes 27 are capable of holding the ink 30, the ink 30 never drip from the recording electrodes 27. Prior to starting printing operation, the solenoid 20 is energized to shift the armature 21 from the position shown in FIG. 2 to the position shown in FIG. 3, and thereby the printing head 10 is moved toward the opposite electrode 11 to the printing position turning the cap 17 to expose the tips 28 of the recording electrodes 27. After the printing operation has been completed, the solenoid 20 is deenergized. Then, the printing head 10 is retracted to the resting position by the extension coil spring 16, and then the cap 17 is returned by the extension coil spring 19 to the initial position where the cap 17 covers up the tips 28 of the recording electrodes 27. Thus, the drying of the ink 30 while the ink dot printer is not used is prevented effectively by the cap 17, and hence the ink 30 is spattered always smoothly from the tips 28 of the recording electrodes 27 for stable printing.

When a signal is given to the high voltage switch 31 by the print control circuit 34, a high voltage is applied across the corresponding recording electrode 27 and the opposite electrode 11, and thereby the ink 30 is spattered toward the opposite electrode 11 by electrostatic energy. Thus, the ink 30 is spattered in dots on the recording sheet 12 and a set of the ink dots forms an image on the recording sheet 12. The printing head and the recording sheet 12 are moved synchronously with each other.

Since the printing head 10 is moved away from the recording sheet 12 while the ink dot printer is not in operation, recording sheet setting operation is not hindered by the printing head 10 and the recording sheet 12 can be easily set on the ink dot printer. The printing head 10 can be simply moved toward and away from the recording sheet 12 by the solenoid 20. Moreover, since the cap 17 is interlocked with the printing head 10, the cap 17 can be simply opened and closed. Furthermore, since the movement of the armature 21 of the electromagnetic device is magnified by the mechanical amplifying mechanism, the range of movement of the armature 21 need not be wide, and hence the size of the solenoid 20 and its peripheral mechanism may be small. The retraction of the printing head 10 by means of the extension coil spring 19 to control the movement of the printing head 10 by both the solenoid 20 and the extension coil spring 19 also effective for reducing the size of the solenoid 20 and its peripheral mechanism.

Figure 5:
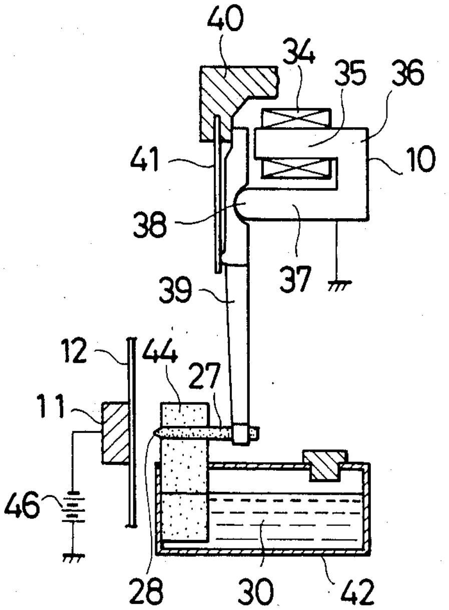
FIG. 5 is a sectional side elevation of a modification of the printing head.
Figure 6:
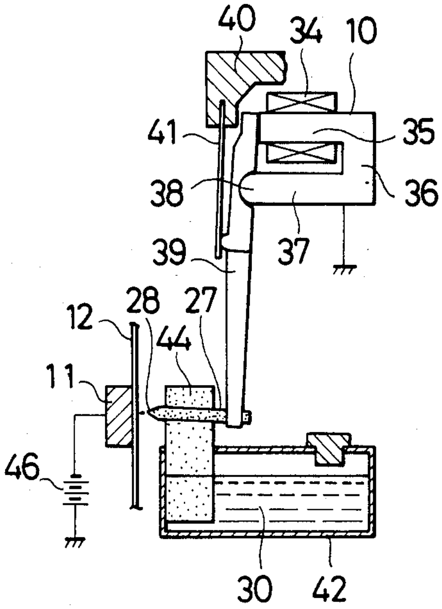
FIG. 6 is a sectional side elevation of the printing head of FIG. 5, in which the printing head is in printing operation.
Figure 7:
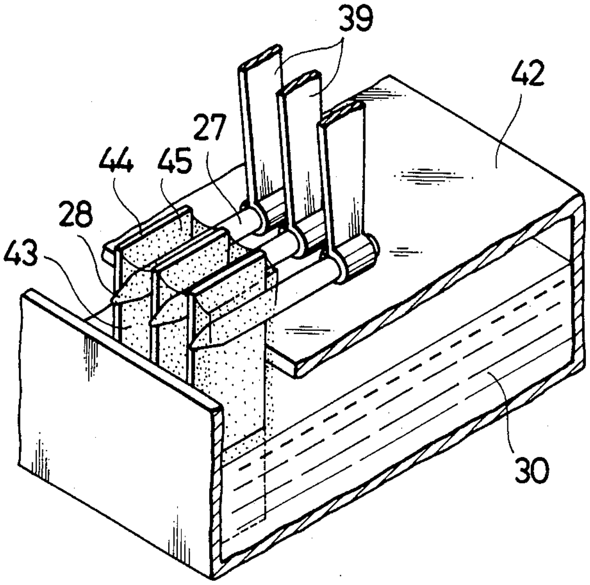
FIG. 7 is a perspective view of part of the printing head of FIG. 5.

A modification of the printing head 10 will be described hereinafter with reference to FIGS. 5 to 7.

This modification is provided with driving electromagnets 36. Each driving electromagnet 36 is formed by winding a driving coil 34 on a core 35. An armature 39 is supported pivotally on a fulcrum 38 formed in the free end of a pole piece 37 of the driving electromagnet 36 and is biased in one direction with a leaf spring 41 fixed to a leaf spring supporting member 40 so that the upper end thereof rests on the leaf spring supporting member 40. The range of movement of the upper end of the armature 39 is defined by the core 35 of the driving electromagnet 36 and the leaf spring supporting member 40. Recording electrodes 27 are attached to the lower ends of the armatures 39, respectively, so as to be located opposite to an opposite electrode 11.

The ink 30 is reserved in an ink tank 42. A plurality of slit forming members 44 are provided in the front end of the ink tank 42 to form a plurality of parallel minute slits 43 therebetween. The surface of the ink 30 contained in the ink tank 42 is elevated by the capillary action of the slits 43 to form ink surfaces 45 in the slits 43. The tips 28 of the recording electrodes 27 are located below the ink surfaces 45, respectively.

The opposite electrode 11 is connected to the positive terminal of a high voltage bias power source 46, while the core 35 of the driving electromagnet 36 is grounded.

Thus, the printing head 10 is formed in a unit, is provided with a cap 17 for covering or exposing the tips 28 of the recording electrodes 27 and is mounted on a carriage 9 so as to be moved toward and away from the opposite electrode 11 by a solenoid 20. In printing operation, a print signal is given to the coil 34 to turn the corresponding armature 39 from the position shown in FIG. 5 to the position shown in FIG. 6 to move the corresponding recording electrode 27 near to the opposite electrode 11. Upon the arrival of the tip 28 of the recording electrode 27 at a position where the potential difference between the recording electrode 27 and the opposite electrode 11 is large enough to spatter the ink 30, the ink 30 is spattered toward the opposite electrode 11 to spatter the ink 30 in a dot on the recording sheet 12.

Figure 9:
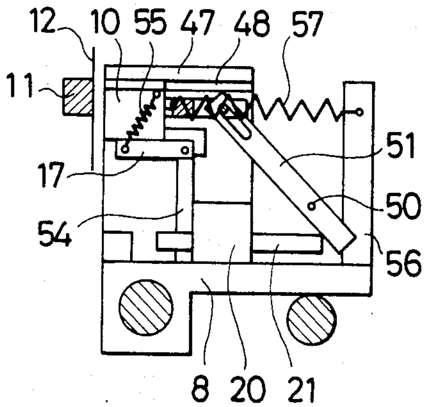
FIG. 9 is a sectional side elevation of the printing head of FIG. 8, in which the printing head is in operation.
Figure 10:
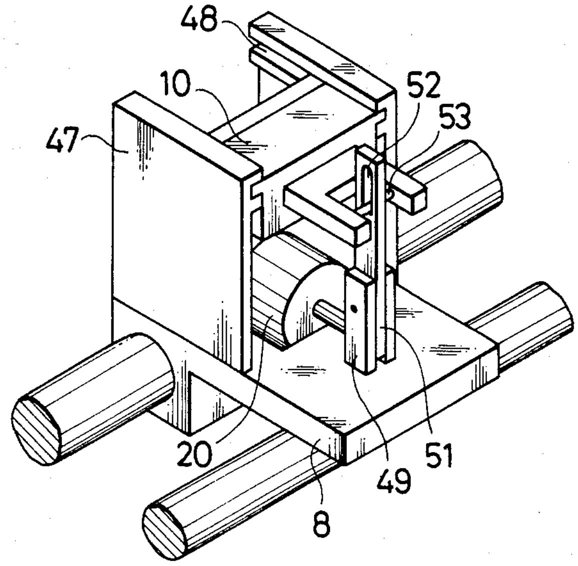
FIG. 10 is a perspective view of the carriage and the printing head of FIG. 8, in which the supports B and C are removed.

A second embodiment of the present invention will be described hereinafter with reference to FIGS. 8 to 10.

The description of the components and constitution of the second embodiment which are the same as those of the first embodiment will be omitted to avoid duplication.

In the second embodiment, a carriage 9 has a pair of opposite guide walls 47 each having a guide groove 48 formed in the upper part of the inner surface thereof. A printing head 10 is guided slidably by the guide grooves 48. The printing head 10 is driven for movement along the guide grooves 48 by an electromagnet having a solenoid 20 disposed below the printing head 10 in the lower part of the carriage 9. The carriage 9 is provided with a support A 49, a support B 54 and a support C 56. A lever 51 is supported on the support A 49. The fulcrum 50 of the lever 51 is decided so that the movement of the point of application is magnified at the point of load. A pin attached to the rear end of the printing head 10 is fitted in a slot 52 formed at the upper end of the lever 51 to connect the printing head 10 to the lever 51. The lower end of the lever 51 is in abutment with the rear end of the armature 21 of the electromagnet. Thus, the lever 51 serves as a mechanical amplifying mechanism for magnifying the movement of the armature 21. A cap 17 is supported swingably on the support B 54. A spring 55 is extended between the printing head 10 and the cap 17 so as to urge the cap 17 in a closing direction. A spring 57 is extended between the printing head 10 and the support C 56 to urge the printing head away from the opposite electrode 11.

Figure 8:
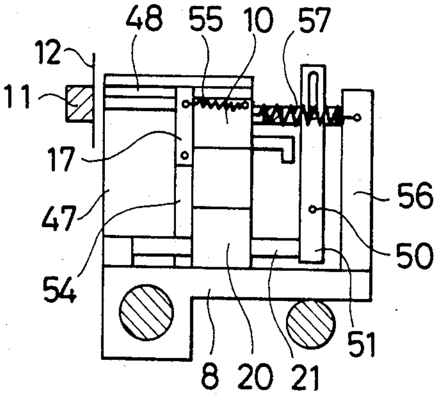
FIG. 8 is a sectional side elevation of a carriage mounted with a printing head, employed in the second embodiment of the present invention, in which the printing head is in the resting position.

As illustrated in FIG. 8, while the ink dot printer is not in operation, the printing head 10 is separated from the opposite electrode 11 by the spring 57 and the cap 17 is closed by the spring 55 to prevent the evaporation of the ink 30. Upon the energization of the solenoid 20, the armature 21 turns the lever 51 to move the printing head 10 toward the opposite electrode 11 to the printing position as illustrated in FIG. 9. While moving toward the opposite electrode 11, the printing head 10 pushes the cap 17 to open the same, so that the tips 28 of the recording electrodes 27 are exposed for printing operation.

A third embodiment of the present invention will be described hereinafter with reference to FIGS. 11 to 17. The description of the components and constitution of the third embodiment which are the same as those of the first and second embodiments will be omitted to avoid duplication.

An ink chamber 60 is formed within the case 26 of a printing head 10 to reserve the ink 30 therein. Recording electrode 27 are placed axially slidably within the ink chamber 60 with the tips 28 thereof exposed outside. The outer surface of the front wall of the case 26 is formed in a cylindrical surface 61. Holes 62 receiving the tips 28 of the recording electrodes 27 are formed through the front wall of the case 26 along the center line of the front wall extending along the cylindrical surface 61. A stopper 63 having a surface intersecting the cylindrical surface 61 at the lower end of the cylindrical surface 61 is provided at the lower end of the cylindrical surface 61. Electromagnets 64 for driving the recording electrodes 27 are disposed behind the ink chamber 60. An armature 65 is disposed opposite to each electromagnet 64 and is joined through an insulating member 66 to the recording electrode 27. The armature 65 is urged away from the corresponding electromagnet 64 by a spring 67.

A cap 17 having a covering surface 69 which fits the cylindrical surface 61 closely is supported pivotally on pivots 68 attached to the side walls of the case 26 on the center of curvature of the cylindrical surface 61. A gear 71 is provided on the base end of the arm 70 of the cap 17 so as to turn together with the cap 17 on the pivot 68. The gear 71 is disposed inside the arm 70.

A hollow stand 72 is provided on the carriage 9. A motor 73, namely, a driving unit, is disposed within the stand 72 and a driving gear 74 is fixed to the driving shaft of the motor 73. The driving gear 74 and the gear 71 of the cap 17 engage through an intermediate gear 75.

A detecting unit 76 for detecting the existence of the recording sheet 12 is provided on the frame of the ink dot printer 7. The detecting unit 76, the driving unit, namely, the motor 73 and a waiting time deciding circuit 78 are connected to the driving unit control circuit 77. A print signal generating circuit 79 is connected to the waiting time deciding circuit 78. The waiting time deciding circuit 78 detects the input wait time of a print signal.

Figure 11:
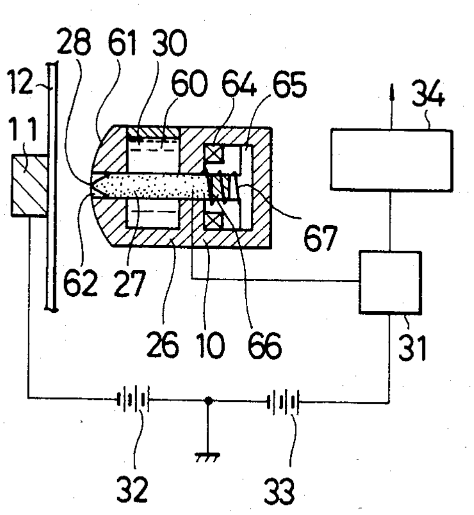
FIG. 11 is a sectional side elevation of a printing head employed in a third embodiment of the present invention, in which the printing head is in the resting position.
Figure 12:
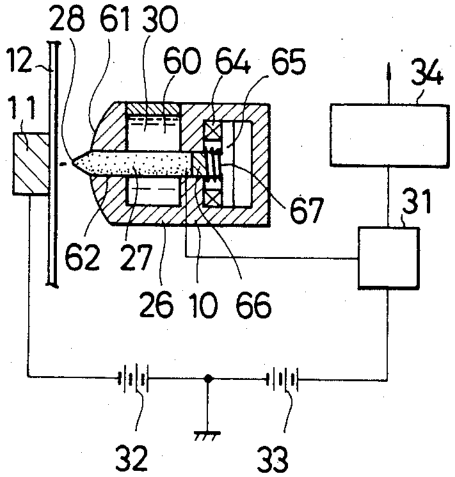
FIG. 12 is a sectional side elevation of the printing head, in which the printing head is in operation.
Figure 13:
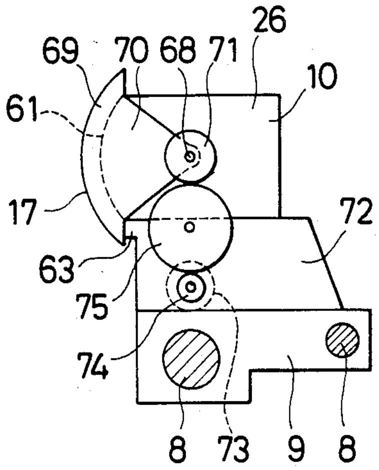
FIG. 13 is a side elevation of the printing head of FIG. 11 mounted on the carriage, in which the printing head is in the resting position.
Figure 14:
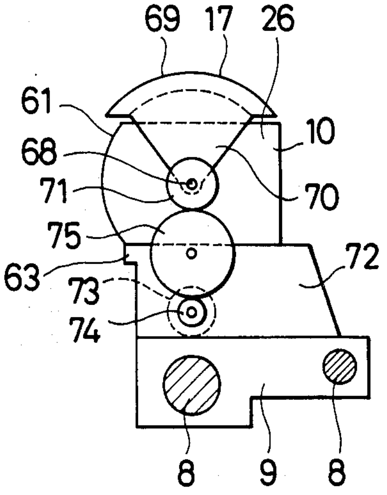
FIG. 14 is a side elevation of the printing head of FIG. 11, in which the printing head is in operation.
Figure 15:
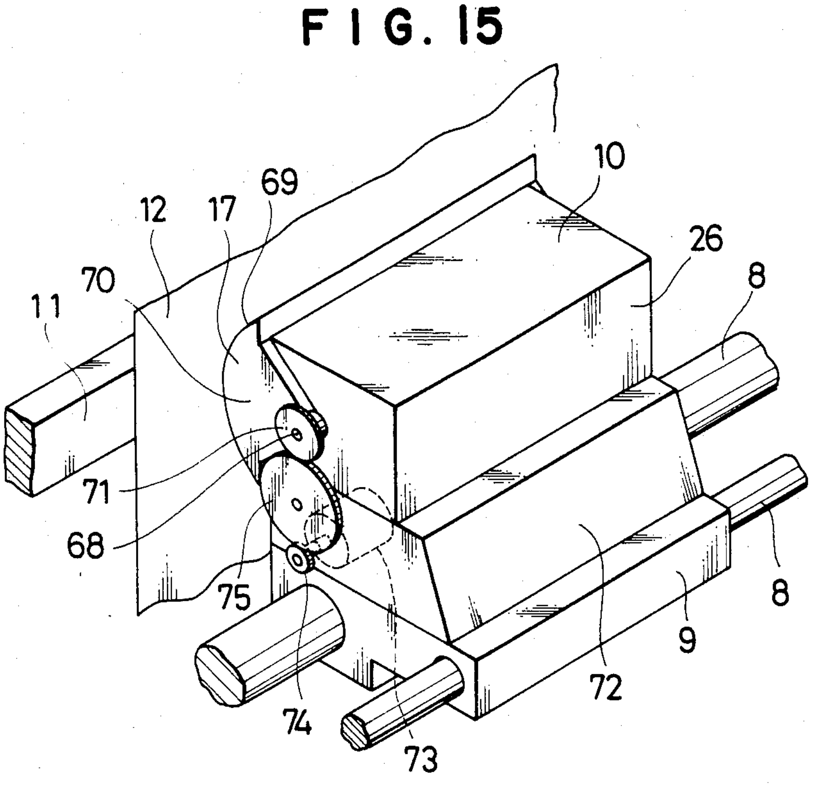
FIG. 15 is a perspective view of the carriage of FIG. 11.
Figure 16:
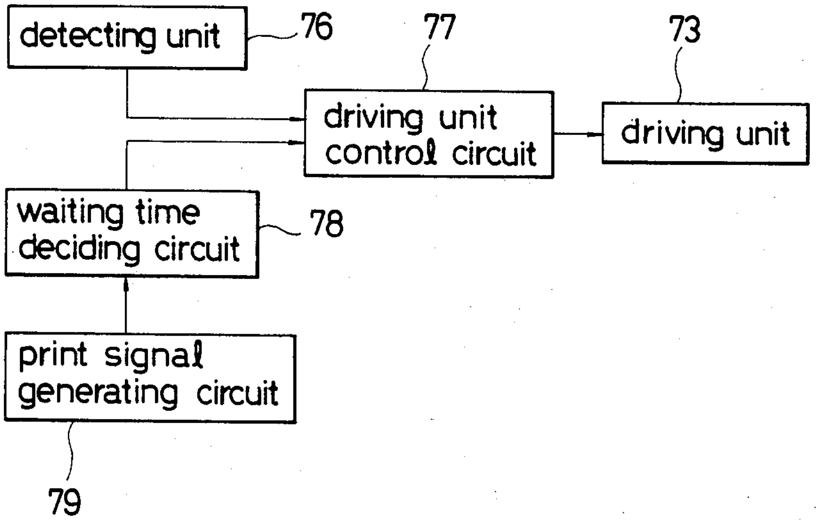
FIG. 16 is a block diagram of a control circuit for controlling the operation of the printing head of FIG. 11.

While the ink dot printer is not in operation, the recording electrodes 27 are retracted inside the cylindrical surface 61 as illustrated in FIG. 11, while the cylindrical surface 61 is covered closely with the cap 17 as illustrated in FIG. 13 to shut off the recording electrodes 27 from the atmosphere. Accordingly, the evaporation of the moisture contained in the ink 30 impregnated into the recording electrodes 27 is prevented, and hence the tips 28 of the recording electrodes 27 are maintained continuously in good printing condition. Thus, the ink dot printer is able to achieve stable printing operation even if the same is operated after a long interruption of printing operation.

Upon the detection of the absence of the recording sheet 12 on the ink dot printer during printing operation or at the start of printing operation, the detecting unit 76 gives a paper empty signal to the driving unit control circuit 77. Then, the driving unit control circuit 77 de-energized the electromagnets 64 and actuates the motor 73, namely, the driving unit, to retract the recording electrodes 27 into the case 26 and to cover up the cylindrical surface 61 so that the tips 28 of the recording electrodes 27 are shut off from the atmosphere. Thus the evaporation of the moisture contained in the ink 30 is prevented. The cap 17 is kept closed until a new recording sheet 12 is set on the ink dot printer.

Figure 17:
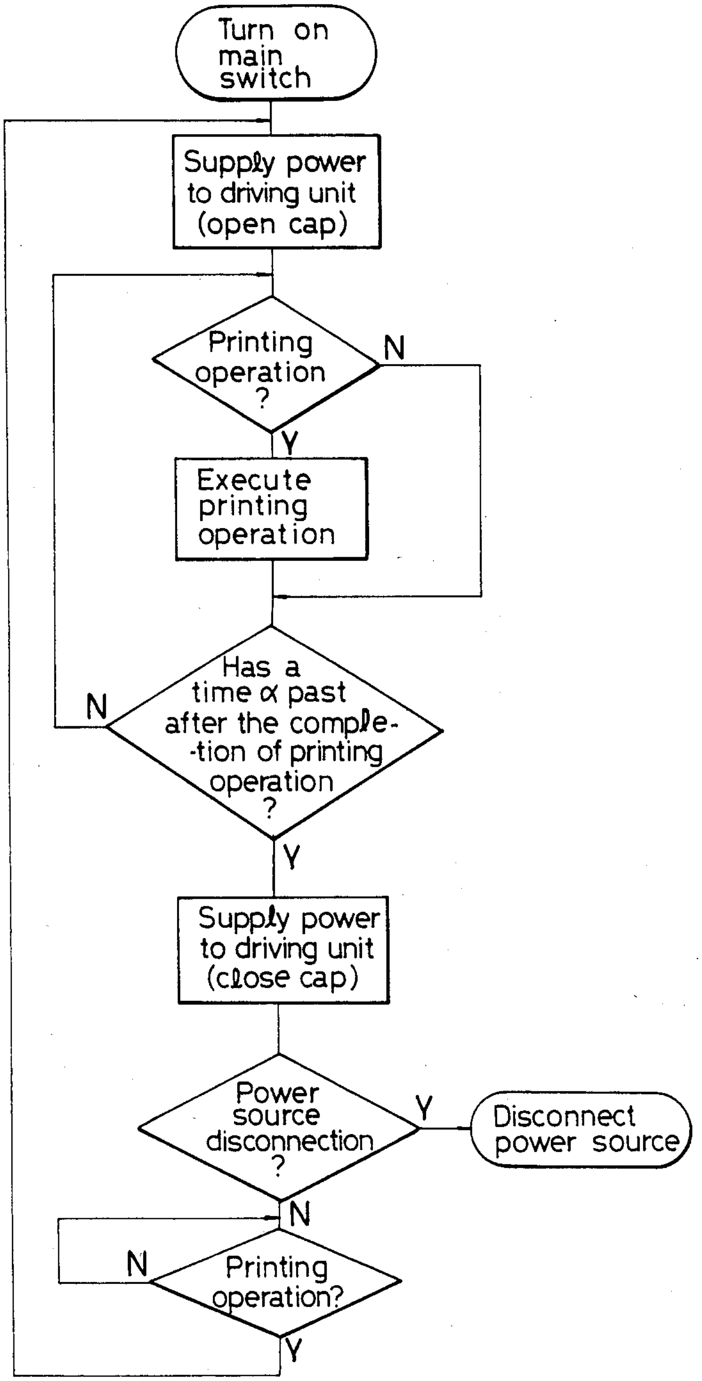
FIG. 17 is a flow chart of a control routine for controlling the ink dot printer according to the present invention.

Control procedures for controlling the operation of the ink dot printer will be described hereinafter with reference to FIG. 17. When the main switch is turned on to connect the ink dot printer to the power source, power is supplied to the motor 73 to open the cap 17, and then printing operation is started when print signals are provided and when any print signal is not given, the ink dot printer remains idle until print signals are provided. In either case, a decision is made as to whether or not a predetermined time $\alpha$ has passed after the end of the last printing operation. When print signals are provided in the predetermiend time $\alpha$ after the end of the last printing operation, the normal printing operation is carried out. On the other hand, when any print signal is not provided in the predetermined time $\alpha$ after the end of the last printing operation, the waiting time deciding circuit 78 provides a signal to de-energize the electromagnets 64 and to supply power to the motor 73. Consequently, the recording electrodes 27 are retracted into the case 26 and the cylindrical surface 61 of the case 26 is covered with the cap 17. When the next print signal is provided by the print signal generating circuit 79, power is supplied again to the motor 73 to open the cap 17. Thus, when the printing operation is interrupted for a time longer than the predetermined time $\alpha$, the tips 28 of the recording electrodes 27 are covered automatically by the cap 17 to prevent the evaporation of the moisture contained in the ink 30 so that the tips 28 of the recording electrodes 27 are maintained in the printing condition.

In the third embodiment, the cap 17 is controlled automatically at an appropriate timing of opening and closing operation. Accordingly, the accessibility of the ink dot printer is improved, erroneous operation is avoided and the drying of the tips 28 of the recording electrodes 27 is prevented completely.

Figure 18:
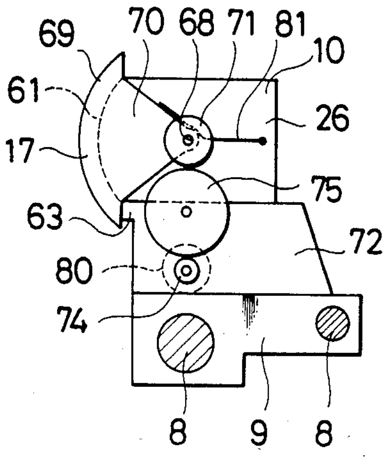
FIG. 18 is a side elevation of a printing head, in a fourth embodiment, according to the present invention mounted on a carriage, in which the printing head is in the resting position.
Figure 19:
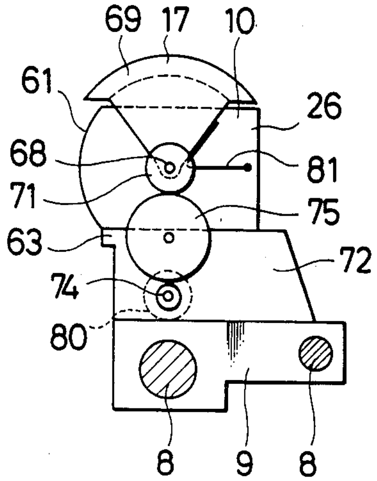
FIG. 19 is a side elevation of the printing head of FIG. 18, in which the printing head is in operation.

A fourth embodiment of the present invention is shown in FIGS. 18 and 19. As apparent from FIGS. 18 and 19, the constitution of the fourth embodiment is substantially the same as that of the third embodiment, except that the fourth embodiment employs a rotary solenoid 80 in place of the motor 73, and a cap 17 is urged in the closing direction by a spring 81. During the printing operation, the rotary solenoid 80 is energized and at the end of the printing operation, the rotary solenoid 80 is de-energized. When the rotary solenoid 80 is energized, the cap 17 is opened to expose recording electrodes 27. When the rotary solenoid 80 is de-energized, the cap 17 becomes free to be turned by the spring 81 and is turned to the closing position to cover up the cylindrical surface 61 of the printing head 10.

Figure 20:
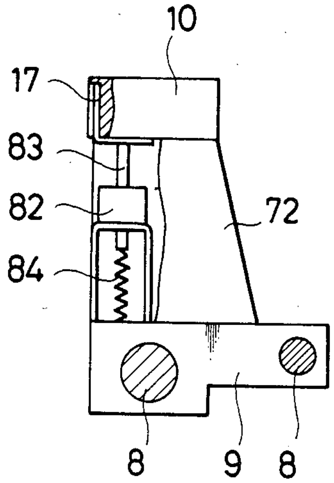
FIG. 20 is a side elevation of a printing head, in a fifth embodiment, according to the present invention, in which the printing head is in the resting position.
Figure 21:
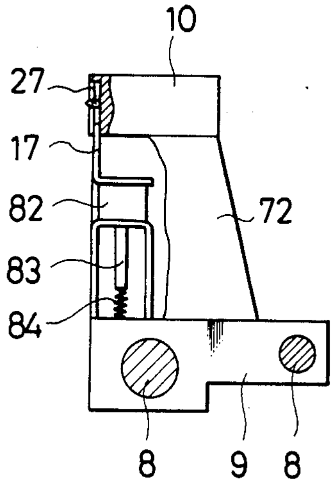
FIG. 21 is a side elevation of the printing head of FIG. 20, in which the printing head is in operation.
Figure 22:
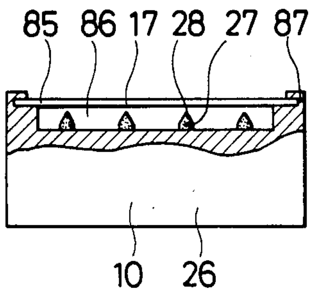
FIG. 22 is a plan view partly in section of the printing head of FIG. 20.

A fifth embodiment of the present invention is shown in FIGS. 20 to 22. In the fifth embodiment, a recess 86 having a flat bottom surface through which the tips 28 of recording electrodes 27 project is formed in the flat front surface 85 of a printing head 10. Guide grooves 87 are formed in the inner surfaces of the opposite side walls of the recess 86, respectively, and a flat cap 17 is inserted slidably in the guide grooves 87 along the flat front surface 85. An electromagnetic driving device comprising a solenoid 82 and an armature 83 is provided to drive the cap 17. The armature 83 is connected to the cap 17 to open the cap 17. The armature 83 is urged in a direction to close the cap 17 by a spring 84.

When a print signal is provided, the solenoid 64 and electromagnetic 64 for making recording electrodes 27 project are energized simultaneously, and thereby the cap 17 is opened synchronously with the projection of the recording electrodes 27. The cap 17 is closed also synchronously with the retraction of the recording electrodes 27 into the body of the printing head 10.

Figure 23:
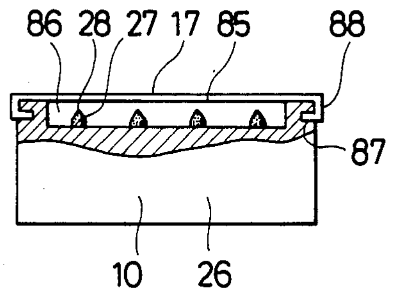
FIGS. 23 is a plan view partly in section of a modification of the printing head of FIG. 20.
Figure 24:
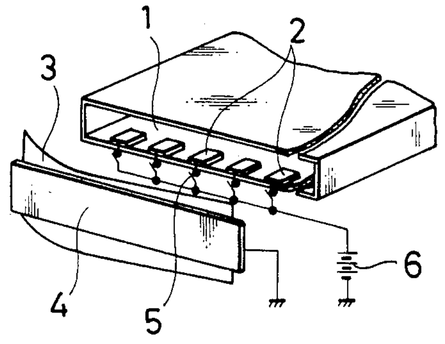
FIG. 24 (PRIOR ART)
FIG. 24 is a perspective view of part of a printing head employed in a conventional ink dot printer.

FIG. 23 illustrates a modification of the fifth embodiment, in which the guide grooves 87 are formed in the outer surfaces of the opposite side walls of the recess 86, and the opposite side ends of a cap 17 is bent in a U-shape to form guide edges 88 which slide along the guide grooves 87.

Although the present invention has been described with reference to its preferred embodiment, it is to be understood that the present invention is not limited to those embodiments described herein and many changes and modifications are possible in the invention without departing from the scope and spirit thereof.

What is claimed is:

1. An ink dot printer for forming an image by spattering the ink in dots from the tips of recording electrodes on a recording medium by the agency of an electric field produced between the recording electrodes and an opposite electrode disposed opposite to the recording electrodes with the recording medium provided therebetween, comprising: a carriage capable of reciprocating along the longitudinal direction of the opposite electrode; a printing head holding the recording electrodes, having openings for exposing the tips of the recording electrodes, and mounted on the carriage; and a cap attached to the carriage so as to be moved to close or open the openings of the printing head.

2. An ink dot printer according to claim 1, wherein said printing head is moveable toward and away from the opposite electrode, and the openings of the printing head are closed by the cap when the printing head is retracted away from the opposite electrode to the resting position.

3. An ink dot printer according to claim 2, wherein said printing head is advanced to and retracted from the printing position by an electromagnetic device.

4. An ink dot printer according to claim 2, wherein said printing head is urged in a direction to move away from the opposite electrode, and the electromagnetic device drives the printing head only toward the opposite electrode.

5. An ink dot printer according to claim 2, wherein said printing head is advanced to and retracted from the printing position by the electromagnetic device, and the printing head driving motion of the electromagnetic device is transmitted to the printing head after being magnified by a mechanical amplifying mechanism such as a lever.

6. An ink dot printer according to claim 2, wherein the printing head advancing and retracting motion is interlocked with the cap opening and closing motion.

7. An ink dot printer according to claim 2, wherein the electromagnetic device for advancing and retracting the printing head and a cap driving unit for opening and closing the cap are actuated synchronously.

8. An ink dot printer according to claim 1, wherein a cap driving unit for opening and closing the cap and a detecting unit for detecting the presence of the recording medium are provided, and the cap driving unit is actuated to close the openings of the printing head with the cap when the detecting unit provides a paper empty signal indicating the absence of the recording medium on the ink dot printer.

9. An ink dot printer according to claim 1, wherein a cap driving unit for opening and closing the cap is provided, and a waiting time deciding circuit is provided to actuate the cap driving unit so as to close the cap when a time longer than a predetermined time passed after the power source had been connected to the ink dot printer or after the end of the last printing operation.

10. An ink dot printer according to claim 1, wherein the surface of the printing head in which openings for exposing the tips of the recording electrode are formed is a cylindrical surface, said cap is supported pivotally on the printing head so as to turn about the center of curvature of the cylindrical surface, and said cap is turned along the cylindrical surface for closing and opening the openings.

11. An ink dot printer according to claim 1, wherein the surface of the printing head in which openings for exposing the tips of the recording electrode are formed in a flat surface, said cap is inserted in guide grooves formed in the printing head so as to guide the cap along the flat surface, and the cap is moved along the flat surface for closing and opening the openings.

* * * * *